United States Patent
Paliwal et al.

(10) Patent No.: US 10,872,129 B2
(45) Date of Patent: Dec. 22, 2020

(54) METHODS FOR PROVIDING AUTOMATED SCALABLE STRATEGIC MODELLING AND DEVICES THEREOF

(71) Applicant: JPMorgan Chase Bank, N.A., New York, NY (US)

(72) Inventors: Deepak Paliwal, Piscataway, NJ (US); Shreedhara Bhat, Nutley, NJ (US); Emil Streminsky, Brooklyn, NY (US); Soyeon Park, Demarest, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 225 days.

(21) Appl. No.: 16/216,610

(22) Filed: Dec. 11, 2018

(65) Prior Publication Data

US 2019/0179866 A1 Jun. 13, 2019

Related U.S. Application Data

(60) Provisional application No. 62/597,554, filed on Dec. 12, 2017.

(51) Int. Cl.
*G06F 17/11* (2006.01)
*G06F 16/34* (2019.01)
*G06F 40/18* (2020.01)
*G06F 40/186* (2020.01)

(52) U.S. Cl.
CPC ............. *G06F 17/11* (2013.01); *G06F 16/34* (2019.01); *G06F 40/18* (2020.01); *G06F 40/186* (2020.01)

(58) Field of Classification Search
CPC .......... G06F 17/11; G06F 16/34; G06F 40/18; G06F 40/186
USPC ....................................................... 708/200
See application file for complete search history.

(56) References Cited

U.S. PATENT DOCUMENTS

2017/0329984 A1* 11/2017 Clough ............... G06F 21/6227
2018/0122497 A1* 5/2018 Pietronigro ............ G16H 10/20
2019/0377776 A1* 12/2019 Bissantz ............... G06F 40/106

* cited by examiner

*Primary Examiner* — Tan V Mai
(74) *Attorney, Agent, or Firm* — Greenblum & Bernstein, P.L.C.

(57) ABSTRACT

Various methods, apparatuses, and media for producing a report are provided. A first input that includes raw data and derived data is received, and mathematical relationships between the derived data and the raw data are determined. The mathematical relationships are used for generating executable code, which is then applied to newly inputted raw data to produce the report.

18 Claims, 4 Drawing Sheets

METHODS FOR PROVIDING AUTOMATED SCALABLE STRATEGIC MODELLING AND DEVICES THEREOF

CROSS-REFERENCE TO RELATED APPLICATION

This application claims the benefit of U.S. Provisional Patent Application Ser. No. 62/597,554, filed Dec. 12, 2017, which is hereby incorporated by reference in its entirety.

BACKGROUND

1. Field of the Disclosure

This technology generally relates to methods and apparatuses for producing reports, and, more particularly, to methods and apparatuses for producing voluminous spreadsheet reports in an automated, efficient, scalable, and reliable manner.

2. Background Information

An entity may produce reports that include large amounts of data arranged in a spreadsheet, such as, for example, Excel spreadsheet reports. These reports may include many fields, some of which include numerical data that is derived from raw data by the use of mathematical relationships and/or formulas.

In many cases, it is desired that a particular spreadsheet report format be replicated for use with new sets of raw data. However, in a circumstance in which only the data from the original spreadsheet report is available, a difficulty may arise when the mathematical relationships are not directly portable into a new report, thereby requiring a regeneration of the entire spreadsheet. This difficulty may be exacerbated when the amount of data included in the spreadsheet is relatively large.

SUMMARY

The present disclosure, through one or more of its various aspects, embodiments, and/or specific features or sub-components, provides, inter alia, various systems, servers, devices, methods, media, programs, and platforms for producing a report. The various aspects, embodiments, features, and/or sub-components provide optimized processes of producing reports based on determining mathematical relationships between raw data and derived data and generating executable code for producing reports from new sets of raw data.

According to an aspect of the present disclosure, a method for producing a report is provided. The method includes receiving a first input that includes a first plurality of data items arranged in a corresponding first plurality of fields and a second plurality of data items arranged in a corresponding second plurality of fields, each of the first plurality of data items including a respective numerical quantity; determining, for at least a first field from among the second plurality of fields, a respective mathematical relationship between a data item included in the at least first field and data items included in at least two fields from among the first plurality of fields; generating, based on a result of the determining, a set of computer-readable instructions for using each determined mathematical relationship with respect to a third plurality of data items that corresponds to the first plurality of fields to generate a fourth plurality of data items that corresponds to the second plurality of fields; receiving a second input that includes the third plurality of data items, each of the third plurality of data items including a respective numerical quantity such that at least one data item from among the third plurality of data items includes a different numerical quantity than the numerical quantity included in the corresponding data item from among the first plurality of data items; and producing the report by executing the set of computer-readable instructions, the report including the third plurality of data items arranged in the first plurality of fields and the fourth plurality of data items arranged in the second plurality of fields.

The first input may include an Excel spreadsheet report.

The generating the set of computer-readable instructions may be performed based on a Java-based implementation.

The determining may further include determining, for at least 1000 fields included in the second plurality of fields, a respective mathematical relationship between each data item included in the corresponding one from among the at least 1000 fields and data items from among the first plurality of data items.

The method may further include determining, for at least a second field from among the second plurality of fields, a respective mathematical relationship between the at least first field from among the second plurality of fields and at least one from among the data items included in the at least two fields from among the first plurality of fields.

The method may further include using each determined mathematical relationship to optimize an order of operations for producing the report. The generating the set of computer-readable instructions may be performed based on the optimized order of operations.

According to another aspect of the present disclosure, a computing apparatus that includes a communication interface and a processor is provided. The processor is configured to receive, via the communication interface, a first input that includes a first plurality of data items arranged in a corresponding first plurality of fields and a second plurality of data items arranged in a corresponding second plurality of fields, each of the first plurality of data items including a respective numerical quantity; determine, for at least a first field from among the second plurality of fields, a respective mathematical relationship between a data item included in the at least first field and data items included in at least two fields from among the first plurality of fields; generate a set of computer-readable instructions for using each determined mathematical relationship with respect to a third plurality of data items that corresponds to the first plurality of fields to generate a fourth plurality of data items that corresponds to the second plurality of fields; receive, via the communication interface, a second input that includes the third plurality of data items, each of the third plurality of data items including a respective numerical quantity such that at least one data item from among the third plurality of data items includes a different numerical quantity than the numerical quantity included in the corresponding data item from among the first plurality of data items; and execute the set of computer-readable instructions to produce a report, the report including the third plurality of data items arranged in the first plurality of fields and the fourth plurality of data items arranged in the second plurality of fields.

The first input may include an Excel spreadsheet report.

The processor may be further configured to generate the set of computer-readable instructions based on a Java-based implementation.

The processor may be further configured to determine, for at least 1000 fields included in the second plurality of fields, a respective mathematical relationship between each data item included in the corresponding one from among the at least 1000 fields and data items from among the first plurality of data items.

The processor may be further configured to determine, for at least a second field from among the second plurality of fields, a respective mathematical relationship between the at least first field from among the second plurality of fields and at least one from among the data items included in the at least two fields from among the first plurality of fields.

The processor may be further configured to use each determined mathematical relationship to optimize an order of operations for producing the report, and generate the set of computer-readable instructions based on the optimized order of operations.

According to yet another aspect of the present disclosure, a non-transitory computer readable medium configured to store first instructions for implementing a method for producing a report is provided. When executed, the first instructions cause a computer to receive a first input that includes a first plurality of data items arranged in a corresponding first plurality of fields and a second plurality of data items arranged in a corresponding second plurality of fields, each of the first plurality of data items including a respective numerical quantity; determine, for at least a first field from among the second plurality of fields, a respective mathematical relationship between a data item included in the at least first field and data items included in at least two fields from among the first plurality of fields; generate a set of computer-readable second instructions for using each determined mathematical relationship with respect to a third plurality of data items that corresponds to the first plurality of fields to generate a fourth plurality of data items that corresponds to the second plurality of fields; receive a second input that includes the third plurality of data items, each of the third plurality of data items including a respective numerical quantity such that at least one data item from among the third plurality of data items includes a different numerical quantity than the numerical quantity included in the corresponding data item from among the first plurality of data items; and execute the set of computer-readable instructions to produce the report, the report including the third plurality of data items arranged in the first plurality of fields and the fourth plurality of data items arranged in the second plurality of fields.

The first input may include an Excel spreadsheet report.

The first instructions may further cause the computer to generate the set of computer-readable second instructions based on a Java-based implementation.

The first instructions may further cause the computer to determine, for at least 1000 fields included in the second plurality of fields, a respective mathematical relationship between each data item included in the corresponding one from among the at least 1000 fields and data items from among the first plurality of data items.

The first instructions may further cause the computer to determine, for at least a second field from among the second plurality of fields, a respective mathematical relationship between the at least first field from among the second plurality of fields and at least one from among the data items included in the at least two fields from among the first plurality of fields.

The first instructions may further cause the computer to use each determined mathematical relationship to optimize an order of operations for producing the report, and generate the set of computer-readable second instructions based on the optimized order of operations.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
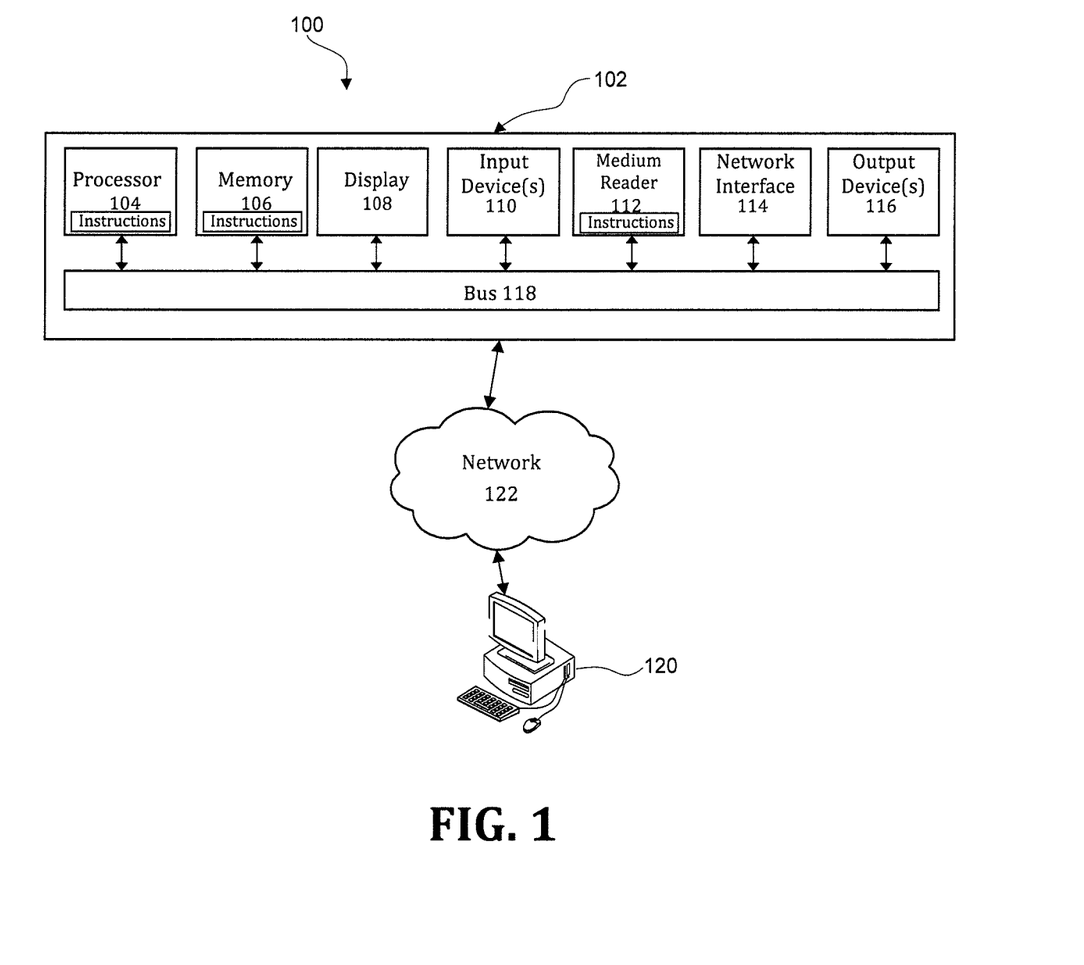
FIG. 1 illustrates an exemplary computer system for producing a report.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of selecting and recommending a transaction mode based on available user transaction modes and a location of a user.

Figure 2:
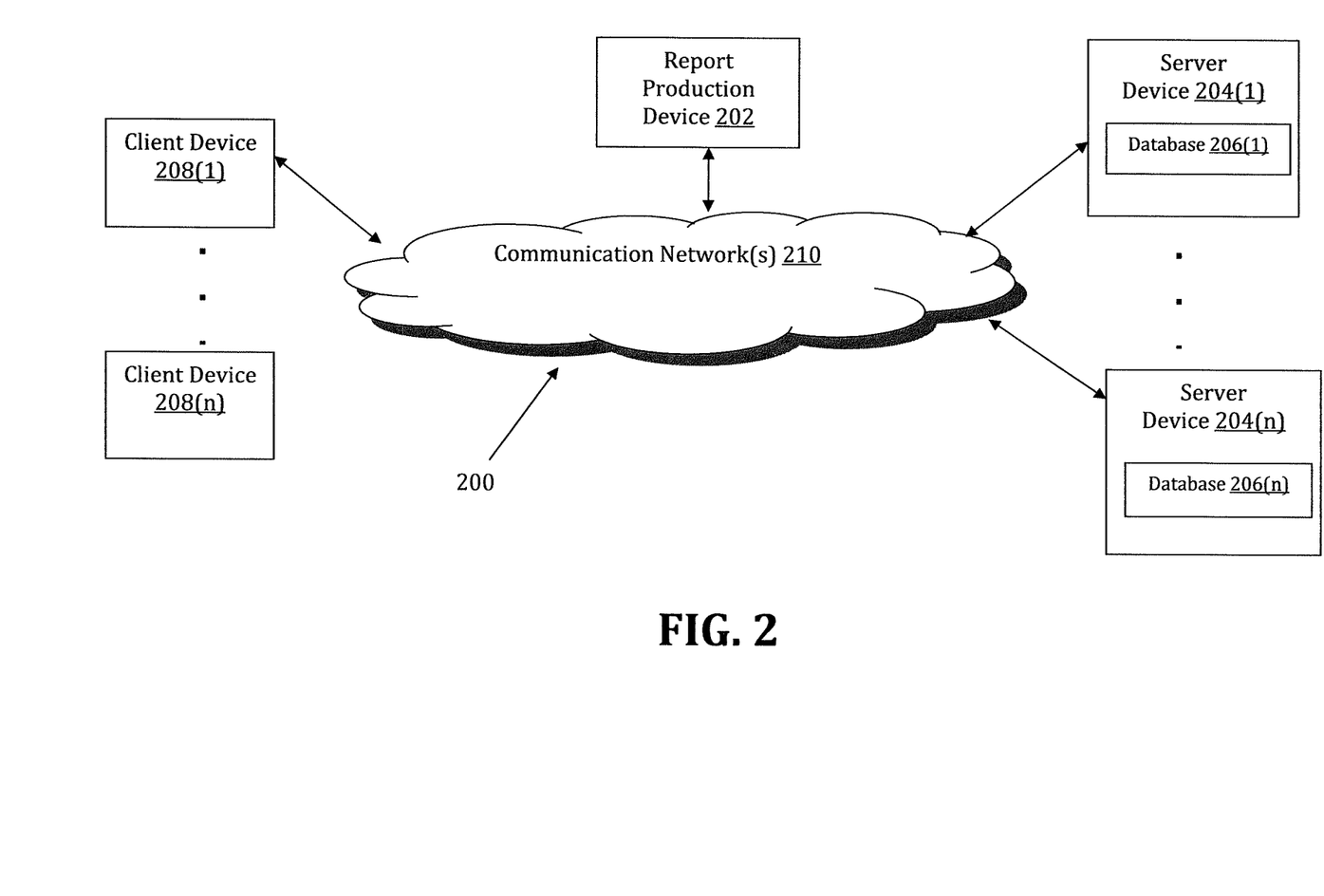
FIG. 2 illustrates an exemplary diagram of a network environment.

Referring to FIG. 2, a schematic of an exemplary network environment 200 for producing an automated, scalable, reliable, and reusable report is illustrated. The report being produced may be, for example, a spreadsheet report that is generated by using Microsoft Excel software and arranged according to a specific format. While generally described herein as being a spreadsheet report, the report to be produced may be any type of report, such as, for example, a tabular listing or a graphical presentation.

The report production may be implemented by a Report Production (RP) device 202. The RP device 202 may be the same or similar to the computer system 102 as described with respect to FIG. 1. The RP device 202 may store one or more applications that can include executable instructions that, when executed by the RP device 202, cause the RP device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the RP device 202 itself, may be located in virtual server(s) running in a cloud-based computing environment rather than being tied to one or more specific physical network computing devices. Also, the application(s) may be running in one or more virtual machines (VMs) executing on the RP device 202. Additionally, in one or more embodiments of this technology, virtual machine(s) running on the RP device 202 may be managed or supervised by a hypervisor.

In the network environment 200 of FIG. 2, the RP device 202 is coupled to a plurality of server devices 204(1)-204(n) that hosts a plurality of databases 206(1)-206(n), and also to a plurality of client devices 208(1)-208(n) via communication network(s) 210. A communication interface of the RP device 202, such as the network interface 114 of the computer system 102 of FIG. 1, operatively couples and communicates between the RP device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the RP device 202, the server devices 204(1)-204(n), and/or the client devices 208(1)-208(n) may be coupled together via other topologies. Additionally, the network environment 10 may include other network devices such as one or more routers and/or switches, for example, which are well known in the art and thus will not be described herein. This technology provides a number of advantages including methods, non-transitory computer readable media, and RP devices that efficiently produce automated, scalable, reliable, and reusable spreadsheet reports.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The RP device 202 may be a standalone device or integrated with one or more other devices or apparatuses, such as one or more of the server devices 204(1)-204(n), for example. In one particular example, the RP device 202 may include or be hosted by one of the server devices 204(1)-204(n), and other arrangements are also possible. Moreover, one or more of the devices of the RP device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the RP device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206

(n) that are configured to store spreadsheet requirements (such as, for example, a formal requirements document such as an Excel Workbook), spreadsheet templates, and newly generated reports.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can facilitate the generation of price quote requests, such as in response to user interaction with graphical user interfaces for example. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the RP device 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the RP device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the RP device 202, the server devices 204(1)-204(n), or the client devices 208(1)-208(n), for example, may be configured to operate as virtual instances on the same physical machine. In other words, one or more of the RP device 202, the server devices 204(1)-204(n), or the client devices 208(1)-208(n) may operate on the same physical device rather than as separate devices communicating through communication network(s) 210.

Additionally, there may be more or fewer RP devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
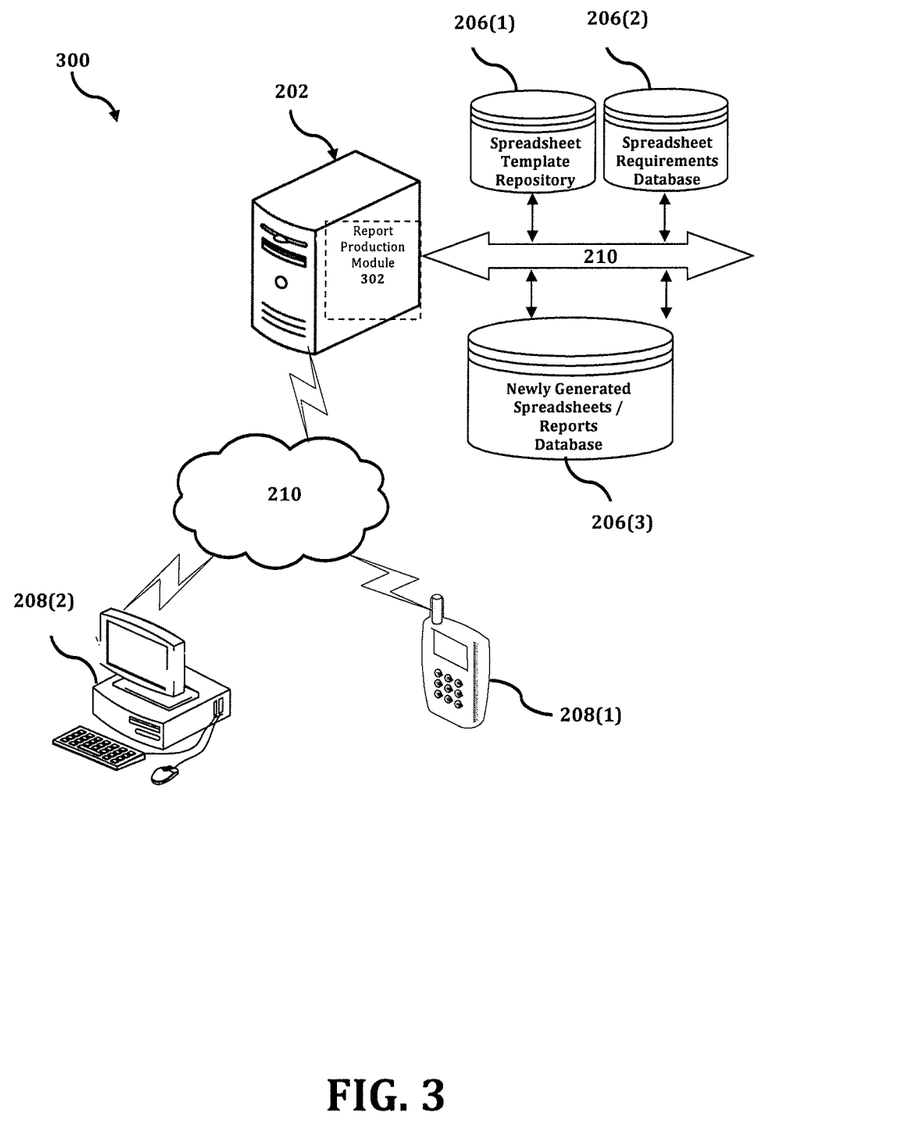
FIG. 3 shows an exemplary system for producing a report.

The RP device 202 is described and shown in FIG. 3 as including a report production module 302, although it may include other rules, policies, modules, databases, or applications, for example. As will be described below, the report production module 302 is configured to produce voluminous spreadsheet reports in an automated, efficient, scalable, and reliable manner. Based on inputs received from one of client devices 208(1)-208(n), the report production module 302 generates a spreadsheet template, and then uses the newly generated spreadsheet template and a newly inputted set of raw data to produce a new spreadsheet report.

An exemplary process 300 for producing a report by utilizing the network environment of FIG. 2 is shown as being conducted in FIG. 3. Specifically, a first client device 208(1) and a second client device 208(2) are illustrated as being in communication with RP device 202. In this regard, the first client device 208(1) and the second client device 208(2) may be "clients" of the RP device 202 and are described herein as such. Nevertheless, it is to be known and understood that the first client device 208(1) and/or the second client device 208(2) need not necessarily be "clients" of the RP device 202, or any entity described in association therewith herein. Any additional or alternative relationship may exist between either or both of the first client device 208(1) and the second client device 208(2) and the RP device 202, or no relationship may exist.

Further, RP device 202 is illustrated as being able to access a spreadsheet template repository database 206(a), a spreadsheet requirements database 206(2), and a newly generated spreadsheets/reports database 206(3). The report production module 302 may be configured to access these databases for implementing a process for producing reports.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the RP device 202 via broadband or cellular communication. Of course, these embodiments are merely exemplary and are not limiting or exhaustive.

Upon being started, the report production module 302 executes a process for producing a report. An exemplary process for producing a report is generally indicated at flowchart 400 in FIG. 4.

Figure 4:
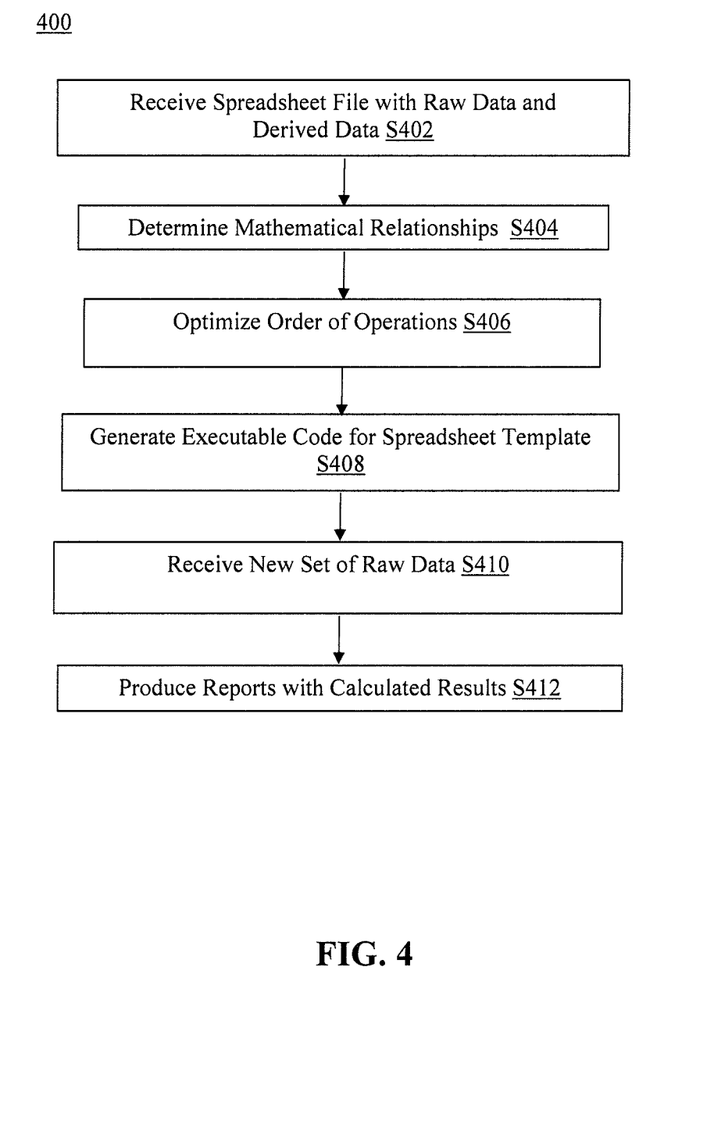
FIG. 4 is a flowchart of an exemplary process for producing a report.

In the process 400 of FIG. 4, a first input that includes a spreadsheet report is received at step S402. The spreadsheet report includes alphanumeric data that is arranged in fields, which may be designated as cells. The alphanumeric data includes two types of numerical quantity data, i.e., raw data and derived data. The raw data may include any numerical data that is obtained directly from a source, such as a measurement device or a user. Each item of the derived data is generally related to the raw data by some mathematical relationship, such as, for example, a formula, by which the derived data can be computed from the raw data. The spreadsheet report may be, for example, a report that is generated from a Microsoft Excel spreadsheet file.

At step S404, the mathematical relationships between the derived data and the raw data are determined by the report production module 302. For example, fields A, B, and C may correspond to raw data that includes numerical values, and fields X, Y, and Z may correspond to derived data that can be determined by applying respective mathematical formulas to the raw data, such as the following equations: $X=(10A+7B)/3C$; $Y=[(10A+7B)/6C]+2.5$; and $Z=5C$. In this aspect, when the mathematical formulas are not known in advance but the raw data and the derived data are provided as numerical quantities, the corresponding formulas may be determined by using algebraic techniques that are implemented by the report production module 302.

Further, the determined mathematical relationships may be simplified by reducing each algebraic expression to its simplest form. For instance, with respect to the above-described example, the expression $Y=[(10A+7B)/6C]+2.5$ may more simply be expressed as $Y=0.5X+2.5$. Such simplifications are of particular importance for spreadsheet reports that include large numbers of fields, such as, for example, at least 1000 fields. In one particular example, a spreadsheet report that is used for Liquidity Coverage Ratio (LCR) reporting and that includes Net Stable Funding Ratio (NSFR) data as raw data may include at least 50,000 fields and at least 50,000 mathematical formulas from which the derived data may be determined by the report production module 302.

At step S406, an order of operations is optimized by the report production module 302. In this regard, an optimization of the order of operations is of particular importance for complex reports that include large numbers of fields, in order to ensure efficiency and reliability. In a complex report, the corresponding mathematical relationships for some fields may be "nested," i.e., an expression for a particular field may depend directly on expressions for other fields such that the values for those other fields should be determined first for the sake of computational speed and efficiency. For an especially complex report, such as the LCR report discussed above, there may be dozens, hundreds, or thousands of such interdependencies between fields, and therefore, an optimization of an order of operations may reduce an overall processing time by orders of magnitude.

At step S408, executable computer-readable code for generating a spreadsheet template is generated by the report production module 302. The code is generated on the basis of the determined mathematical relationships and the optimized order of operations. In this aspect, by generating code that corresponds to the formulas, all of the formulas are thereby embedded into the template so that future reports may be produced from any new set of raw data by the report production module 302. In an exemplary embodiment, the computer-readable code may be generated based on a Java-based implementation.

At step S410, a new set of raw data is received, and in step S412, a new report is produced by using the newly received set of raw data to calculate results that are stored, e.g., in newly generated spreadsheets/reports database 206(3). In an exemplary embodiment, when a particular type of raw data is regularly and periodically updated in accordance with a standard update interval, i.e., a monthly interval, a biweekly interval, a weekly interval, a daily interval, or an hourly interval, a corresponding spreadsheet report may be produced automatically by applying the template that executes the code for implementing the mathematical formulas to the newly received set of raw data.

The report production module 302 may be further configured to perform other functions that relate to spreadsheet report production. In an exemplary embodiment, the report production module 302 may be further configured to access requirements that are stored in the spreadsheet requirements database 206(2), i.e., requirements that are included in a Microsoft Excel Workbook, in order to ensure proper governance of the report production process.

In an exemplary embodiment, a user interface is provided to at least one of client devices 208(1)-208(n) to implement the method illustrated in FIG. 4. For example, the user interface may enable a user to provide an initial input of a spreadsheet report that is desired by the user for subsequent report production based on future sets of raw data. As another example, the user interface may enable a user to request that a previously generated spreadsheet template that is stored in the spreadsheet template repository 206(1) be used for producing a new report based on new set of raw data, which also may be inputted by the user via the user interface. These inputs may be received by RP device 202, and by executing the method illustrated in FIG. 4, the requested reports may generated quickly and efficiently, while ensuring a high degree of data quality.

Accordingly, with this technology, an optimized process for producing spreadsheet reports is provided. The optimized process enables a user to quickly and efficiently obtain complex reports in a desired format.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for producing a report, comprising:
   receiving a first input that includes a first plurality of data items arranged in a corresponding first plurality of fields and a second plurality of data items arranged in a corresponding second plurality of fields, each of the first plurality of data items including a respective numerical quantity;
   determining, for at least a first field from among the second plurality of fields, a respective mathematical relationship between a data item included in the at least first field and data items included in at least two fields from among the first plurality of fields;
   generating, based on a result of the determining, a set of computer-readable instructions for using each determined mathematical relationship with respect to a third plurality of data items that corresponds to the first plurality of fields to generate a fourth plurality of data items that corresponds to the second plurality of fields;
   receiving a second input that includes the third plurality of data items, each of the third plurality of data items including a respective numerical quantity such that at least one data item from among the third plurality of data items includes a different numerical quantity than the numerical quantity included in the corresponding data item from among the first plurality of data items; and
   producing the report by executing the set of computer-readable instructions, the report including the third plurality of data items arranged in the first plurality of fields and the fourth plurality of data items arranged in the second plurality of fields.

2. The method of claim 1, wherein the first input includes an Excel spreadsheet report.

3. The method of claim 1, wherein the generating the set of computer-readable instructions comprises generating the set of computer-readable instructions based on a Java-based implementation.

4. The method of claim 1, wherein the determining further comprises determining, for at least 1000 fields included in the second plurality of fields, a respective mathematical relationship between each data item included in the corresponding one from among the at least 1000 fields and data items from among the first plurality of data items.

5. The method of claim 1, further comprising determining, for at least a second field from among the second plurality of fields, a respective mathematical relationship between the at least first field from among the second plurality of fields and at least one from among the data items included in the at least two fields from among the first plurality of fields.

6. The method of claim 5, further comprising using each determined mathematical relationship to optimize an order of operations for producing the report, wherein the generating the set of computer-readable instructions further comprises generating the set of computer-readable instructions based on the optimized order of operations.

7. A computing apparatus, comprising:
a communication interface; and
a processor,
wherein the processor is configured to:
receive, via the communication interface, a first input that includes a first plurality of data items arranged in a corresponding first plurality of fields and a second plurality of data items arranged in a corresponding second plurality of fields, each of the first plurality of data items including a respective numerical quantity;
determine, for at least a first field from among the second plurality of fields, a respective mathematical relationship between a data item included in the at least first field and data items included in at least two fields from among the first plurality of fields;
generate a set of computer-readable instructions for using each determined mathematical relationship with respect to a third plurality of data items that corresponds to the first plurality of fields to generate a fourth plurality of data items that corresponds to the second plurality of fields;
receive, via the communication interface, a second input that includes the third plurality of data items, each of the third plurality of data items including a respective numerical quantity such that at least one data item from among the third plurality of data items includes a different numerical quantity than the numerical quantity included in the corresponding data item from among the first plurality of data items; and
execute the set of computer-readable instructions to produce a report, the report including the third plurality of data items arranged in the first plurality of fields and the fourth plurality of data items arranged in the second plurality of fields.

8. The computing apparatus of claim 7, wherein the first input includes an Excel spreadsheet report.

9. The computing apparatus of claim 7, wherein the processor is further configured to generate the set of computer-readable instructions based on a Java-based implementation.

10. The computing apparatus of claim 7, wherein the processor is further configured to determine, for at least 1000 fields included in the second plurality of fields, a respective mathematical relationship between each data item included in the corresponding one from among the at least 1000 fields and data items from among the first plurality of data items.

11. The computing apparatus of claim 7, wherein the processor is further configured to determine, for at least a second field from among the second plurality of fields, a respective mathematical relationship between the at least first field from among the second plurality of fields and at least one from among the data items included in the at least two fields from among the first plurality of fields.

12. The computing apparatus of claim 11, wherein the processor is further configured to use each determined mathematical relationship to optimize an order of operations for producing the report, and generate the set of computer-readable instructions based on the optimized order of operations.

13. A non-transitory computer-readable medium configured to store first instructions for implementing a method for producing a report, wherein when executed, the first instructions cause a computer to:
receive a first input that includes a first plurality of data items arranged in a corresponding first plurality of fields and a second plurality of data items arranged in a corresponding second plurality of fields, each of the first plurality of data items including a respective numerical quantity;
determine, for at least a first field from among the second plurality of fields, a respective mathematical relationship between a data item included in the at least first field and data items included in at least two fields from among the first plurality of fields;
generate a set of computer-readable second instructions for using each determined mathematical relationship with respect to a third plurality of data items that corresponds to the first plurality of fields to generate a fourth plurality of data items that corresponds to the second plurality of fields;
receive a second input that includes the third plurality of data items, each of the third plurality of data items including a respective numerical quantity such that at least one data item from among the third plurality of data items includes a different numerical quantity than the numerical quantity included in the corresponding data item from among the first plurality of data items; and
execute the set of computer-readable second instructions to produce the report, the report including the third plurality of data items arranged in the first plurality of fields and the fourth plurality of data items arranged in the second plurality of fields.

14. The computer-readable medium of claim 13, wherein the first input includes an Excel spreadsheet report.

15. The computer-readable medium of claim 13, wherein the first instructions further cause the computer to generate the set of computer-readable second instructions based on a Java-based implementation.

16. The computer-readable medium of claim 13, wherein the first instructions further cause the computer to determine, for at least 1000 fields included in the second plurality of fields, a respective mathematical relationship between each data item included in the corresponding one from among the at least 1000 fields and data items from among the first plurality of data items.

17. The computer-readable medium of claim 13, wherein the first instructions further cause the computer to determine, for at least a second field from among the second plurality of fields, a respective mathematical relationship between the at least first field from among the second plurality of fields and at least one from among the data items included in the at least two fields from among the first plurality of fields.

18. The computer-readable medium of claim 17, wherein the first instructions further cause the computer to use each determined mathematical relationship to optimize an order of operations for producing the report, and generate the set of computer-readable second instructions based on the optimized order of operations.

\* \* \* \* \*